(12) United States Patent
Nakajima et al.

(10) Patent No.: US 12,548,539 B2
(45) Date of Patent: Feb. 10, 2026

(54) ELECTRONIC DEVICE AND ELECTRONIC MUSICAL INSTRUMENT

(71) Applicant: CASIO COMPUTER CO., LTD., Tokyo (JP)

(72) Inventors: Mari Nakajima, Hino (JP); Kouji Oshima, Fussa (JP); Yuuki Nakajima, Tachikawa (JP); Naoto Imamura, Akishima (JP); Ryohei Kobayashi, Akishima (JP); Shingo Fukushima, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 850 days.

(21) Appl. No.: 17/571,997

(22) Filed: Jan. 10, 2022

(65) Prior Publication Data

US 2022/0270578 A1  Aug. 25, 2022

(30) Foreign Application Priority Data

Feb. 25, 2021  (JP) ................. 2021-028132

(51) Int. Cl.
*G10H 1/34* (2006.01)
*G06F 3/02* (2006.01)
*G10H 1/00* (2006.01)

(52) U.S. Cl.
CPC ............ *G10H 1/34* (2013.01); *G06F 3/02* (2013.01); *G10H 1/0016* (2013.01); *G10H 2220/041* (2013.01)

(58) Field of Classification Search
CPC .. G06F 3/02; G10H 1/0016; G10H 2220/041; G10H 2220/315; G05G 1/10
See application file for complete search history.

(56) References Cited

U.S. PATENT DOCUMENTS

| | | | | |
|---|---|---|---|---|
| 3,534,706 | A | * | 10/1970 | Crispell ................. F24C 7/082 116/319 |
| 4,214,501 | A | | 7/1980 | Von Kemenczky |
| 2004/0137984 | A1 | | 7/2004 | Salter |
| 2010/0134964 | A1 | | 6/2010 | Smith et al. |

FOREIGN PATENT DOCUMENTS

| | | | | |
|---|---|---|---|---|
| CN | 203812553 | U | | 9/2014 |
| EP | 1074766 | A3 | * | 5/2003 ......... F16H 59/0217 |
| JP | H05150851 | A | * | 6/1993 ............ G10D 13/02 |
| JP | H07008928 | U | | 2/1995 |
| JP | H10003289 | A | | 1/1998 |

(Continued)

OTHER PUBLICATIONS

Indian Office Action (and English language translation) dated Sep. 14, 2022, issued in counterpart Indian Application No. 202214004259.

(Continued)

*Primary Examiner* — Kimberly R Lockett
(74) *Attorney, Agent, or Firm* — Holtz, Holtz & Volek PC

(57) ABSTRACT

An electronic device, which is an electronic musical instrument as an electronic device, includes: a rotating shaft inclined with respect to a perpendicular line of a panel; and a rotary knob that is attached to the rotating shaft and has a fingering marker portion provided opposite to an inclination direction of the rotating shaft.

18 Claims, 7 Drawing Sheets

(56) References Cited

FOREIGN PATENT DOCUMENTS

| | | | |
|---|---|---|---|
| JP | 2000100269 | A | 4/2000 |
| JP | 2007033862 | A | 2/2007 |
| JP | 2010164709 | A | 7/2010 |
| JP | 2012243613 | A | 12/2012 |
| JP | 2014203035 | A | 10/2014 |
| JP | 6451796 | B2 | 12/2018 |

OTHER PUBLICATIONS

Indian Hearing Notice dated Sep. 2, 2024, issued in counterpart Indian Application No. 202214004259.

* cited by examiner

ELECTRONIC DEVICE AND ELECTRONIC MUSICAL INSTRUMENT

CROSS-REFERENCE TO RELATED APPLICATIONS

This application is based on and claims priority under 35 USC 119 from Japanese Patent Application No. 2021-028132, filed on Feb. 25, 2021, the contents of which are incorporated herein by reference.

TECHNICAL FIELD

The present disclosure relates to an electronic device and an electronic musical instrument.

BACKGROUND ART

In the related art, disclosed is an electronic device in which a rotary knob is attached to an attaching portion of an electronic component having a rotating shaft for configuration or the like of the device. JP2000-100269A discloses that a rotary encoder as an electronic component is provided in a hole portion of a panel and an end of a cylindrical shaft part of a knob member (a knob, a rotary knob) into which an attaching portion of a rotating shaft of the rotary encoder is inserted is provided with an engaging latch and a guide piece. According to this configuration, the engaging latch prevents the knob member from falling off the panel and from being damaged by external pressure in a direction perpendicular to the rotating shaft.

In some cases, a rotating shaft of such an electronic component is slightly inclined when manufactured. If an electronic component with a rotating shaft slightly inclined is attached to a panel of an electronic device, a knob member is attached inclined with respect to the panel. When the knob member remains stationary, the incline of the knob member with respect to the panel may be unnoticeable. However, for example, when the knob member is continuously rotated, the knob member may appear to be warped.

SUMMARY

An electronic device according to an embodiment of the present disclosure includes:
  a rotating shaft inclined with respect to a perpendicular line of a panel; and
  a rotary knob that is attached to the rotating shaft and has a fingering marker portion provided opposite to an inclination direction of the rotating shaft.

An electronic musical instrument according to an embodiment of the present disclosure includes:
  a rotating shaft inclined with respect to a perpendicular line of a panel;
  a rotary knob that is attached to the rotating shaft and has a fingering marker portion provided opposite to an inclination direction of the rotating shaft; and
  a speaker configured to produce a musical sound based on rotating operation of the rotary knob.

BRIEF DESCRIPTION OF DRAWINGS

Exemplary embodiments of the present disclosure will be described in detail based on the following figures, wherein.

DETAILED DESCRIPTION

Figure 1:
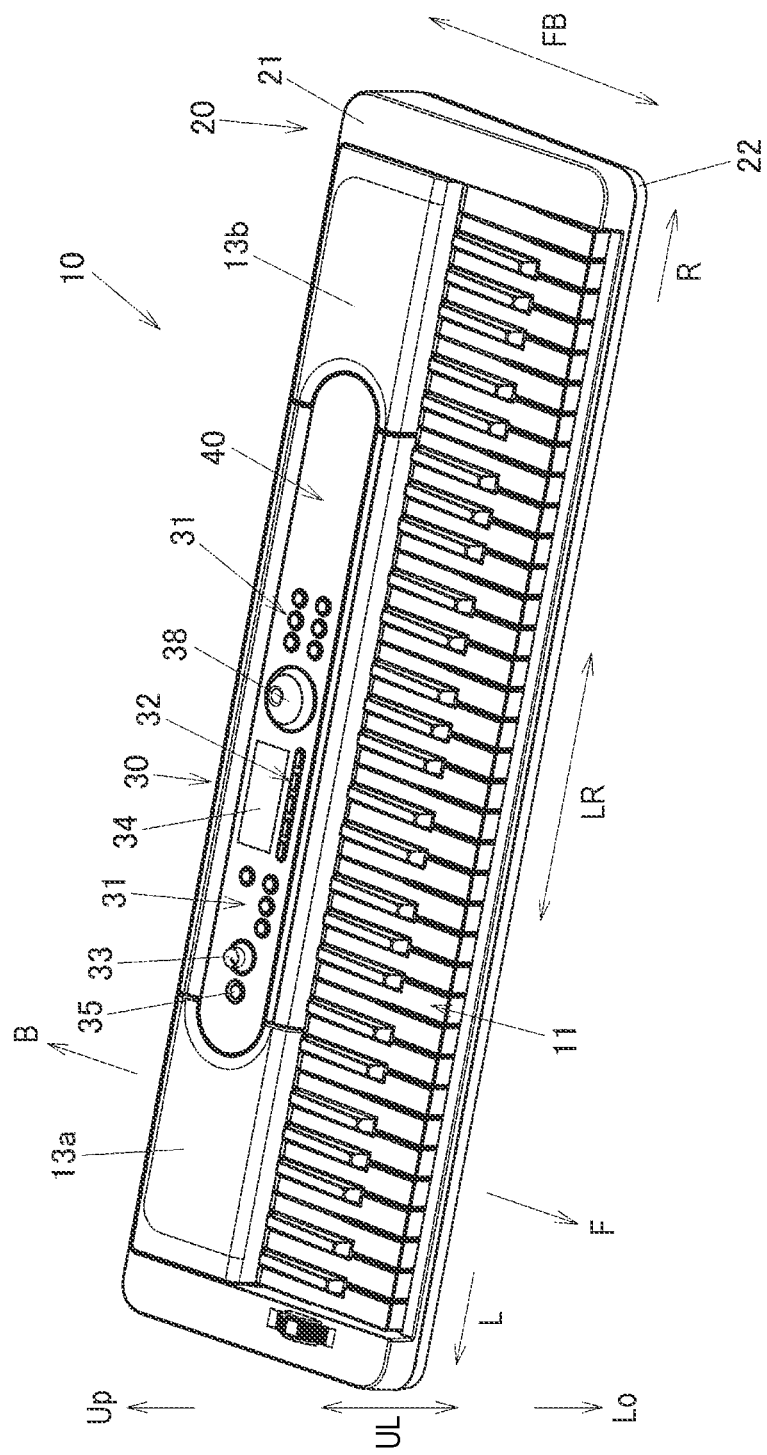
FIG. 1 is a perspective view of an electronic keyboard instrument, which is an electronic musical instrument as an electronic device according to an embodiment of the present disclosure.

In the following, an embodiment of the present disclosure will be described with reference to the drawings. An electronic keyboard instrument 10, which is an electronic musical instrument as an electronic device according to an embodiment of the present disclosure, shown in FIG. 1 includes a 61-key keyboard 11 and a musical instrument case 20. In the following, the front in a front-back direction FB of the keys of the keyboard 11 is referred to as a front side F, the back in the front-back direction FB of the keys is referred to as a back side B, the left facing the keyboard 11 is referred to as a left side L, and the right facing the keyboard 11 is referred to as a right side R. An aligning direction of the keys of the keyboard 11 is the left-right direction. The upper in an upper-lower direction UL of the electronic keyboard instrument 10 is referred to as an upper side Up, and the lower is referred to as a lower side Lo.

The musical instrument case 20 has a substantially long rectangular plate shape whose left-right direction is a longer direction and is divided into an upper case 21 and a lower case 22. The upper case 21 and the lower case 22 are formed of a resin material. In the musical instrument case 20, a substrate, a battery that is a power source, and the like are accommodated.

The electronic keyboard instrument 10 has a panel 40 provided in the middle of a back upper surface of the musical instrument case 20 (upper case 21). The panel 40 is provided with a control panel 30 for performing a variety of settings and the like. Speaker part 13a is provided on the left side L of the panel 40 of the electronic keyboard instrument 10, and speaker part 13b is provided on the right side R of the panel 40 of the electronic keyboard instrument 1. Upper surfaces of the speaker parts 13a and 13b are formed with holes (not shown), and speakers are provided in the musical instrument case 20 correspondingly to the holes.

The control panel 30 is provided with: control buttons 31 having a circular shape as seen from above; and a knob 33 having a circular shape as seen from above. In addition, a rotary knob 38 having a larger size (larger diameter) than the buttons 31 and the knob 33 is provided in the middle of the control panel 30. A display 34 on which a variety of setting states or the like are displayed is provided on the left side L of the rotary knob 38, and key switches 32 having rounded rectangular shapes are provided on the front side of the display 34. A power button 35 is provided around a left end of the control panel 30. The panel 40, on which the control panel 30 is provided, and the speaker parts 13a and 13b are inclined slightly upright with respect to a horizontal surface for easier handling of control panel 30. The electronic keyboard instrument 10, which is an electronic musical instrument, is configured to produce a musical sound based on a rotating operation of the rotary knob 38 from the speakers.

As shown in FIGS. 2 to 5, the panel 40 has: a panel main body 41; and a panel sheet 42 placed on an upper surface of the panel main body 41. A front end and a back end of the panel main body 41 are provided with convex arc portions 41a and 41b that are formed in convex arc shapes in a cross-sectional view in the front-back direction and extend in the left-right direction. The panel sheet 42 is placed on a flat surface between the front and back convex arc portions 41a and 41b. Function signs, such as the power button 35, the buttons 31, the knob 33, the key switches 32, the rotary knob 38, and the like, are printed on the panel sheet 42.

The rotary knob 38 is provided in a rotary-knob placement portion 45 provided on the panel 40. As shown in a perspective view of FIG. 5 without the rotary knob 38 of FIG. 2, the rotary-knob placement portion 45 has a circular concave shape. In a rotary-knob placement portion 45, opening portions 45a and 45b are provided between a bottom surface and an inner wall surface on the front and back sides (also refer to FIG. 3). As shown in FIGS. 3 to 5, an annular protrusion 45c is provided on the bottom surface of the rotary-knob placement portion 45. The inner wall surface of the rotary-knob placement portion 45 extends upward. An outer periphery (outer side) of the rotary-knob placement portion 45 is provided with an annular rib 45d protruding annularly from the upper surface of the panel main body 41. The inner wall surface of the rotary-knob placement portion 45 continuously connects to an inner peripheral surface of the annular rib 45d.

In the middle of the rotary-knob placement portion 45, a rectangular hole portion 45e is provided. A substrate 14 on a lower surface of the panel 40 is exposed through the rectangular hole portion 45e. A rotary encoder 50 as an electronic component provided on the substrate 14 is provided in the rectangular hole portion 45e. The rotary knob 38 is attached to a rotating shaft 51 (specifically, an attaching portion 51a to be described later) of the rotary encoder 50.

As shown in FIGS. 3 and 4, the rotary knob 38 has a short cylindrical cap shape whose bottom faces upward. The rotary knob 38 includes: a top plate portion 38a having an upper surface and a circular shape; a large-diameter wall portion 38b having a cylindrical wall surface whose diameter is larger than a diameter of the top plate portion 38a; and a concave connecting portion 38c connecting the top plate portion 38a and the large-diameter wall portion 38b in a concave curved shape in a cross-sectional view. An outer peripheral surface of the concave connecting portion 38c is with mirror finish. The large-diameter wall portion 38b is accommodated in the concave rotary-knob placement portion 45, but a connecting portion 38d between the large-diameter wall portion 38b and the concave connecting portion 38c is substantially the same height as a protruding tip of the annular rib 45d. An outer peripheral surface of the large-diameter wall portion 38b is provided with an annular groove portion or the like, as appropriate.

In the rotary knob 38, a shaft insertion portion 38e having a cylindrical shape extends downward from the top plate portion 38a. An attaching portion 51a of the rotating shaft 51 of the rotary encoder 50 to be described later is inserted into the shaft insertion portion 38e. The attaching portion 51a of the rotating shaft 51 of the rotary encoder 50 is a D-shaped shaft as seen from above, or a shaft in which a chipped portion 51a1 is provided opposite to a curved surface 51a2. An inner-diameter portion of the shaft insertion portion 38e of the rotary knob 38 has a shape (D-shape) similar to the attaching portion 51a of the rotating shaft 51 of the rotary encoder 50. The attaching portion 51a is inserted into the shaft insertion portion 38e. The shaft insertion portion 38e is provided with a notch 38e1 correspondingly to the chipped portion 51a1 of the attaching portion 51a for easier insertion of the attaching portion 51a. The notch 38e1 has a slit extending upward from a wide notch (refer to FIG. 4). In this way, the rotary knob 38 is attached to the rotating shaft 51 of the rotary encoder 50.

Figure 2:
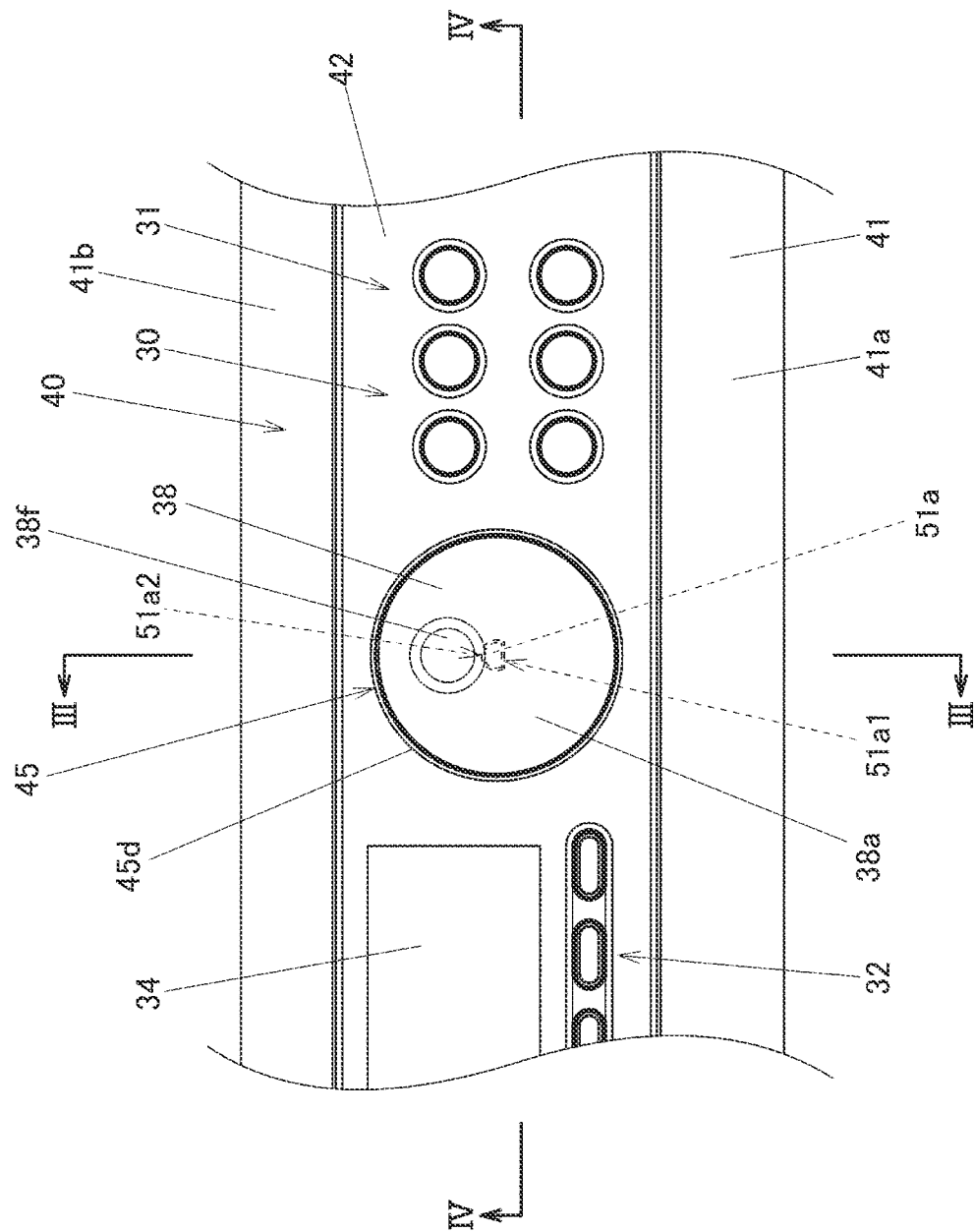
FIG. 2 is an enlarged plane view around a rotary knob of the electronic keyboard instrument according to the embodiment of the present disclosure.
Figure 3:
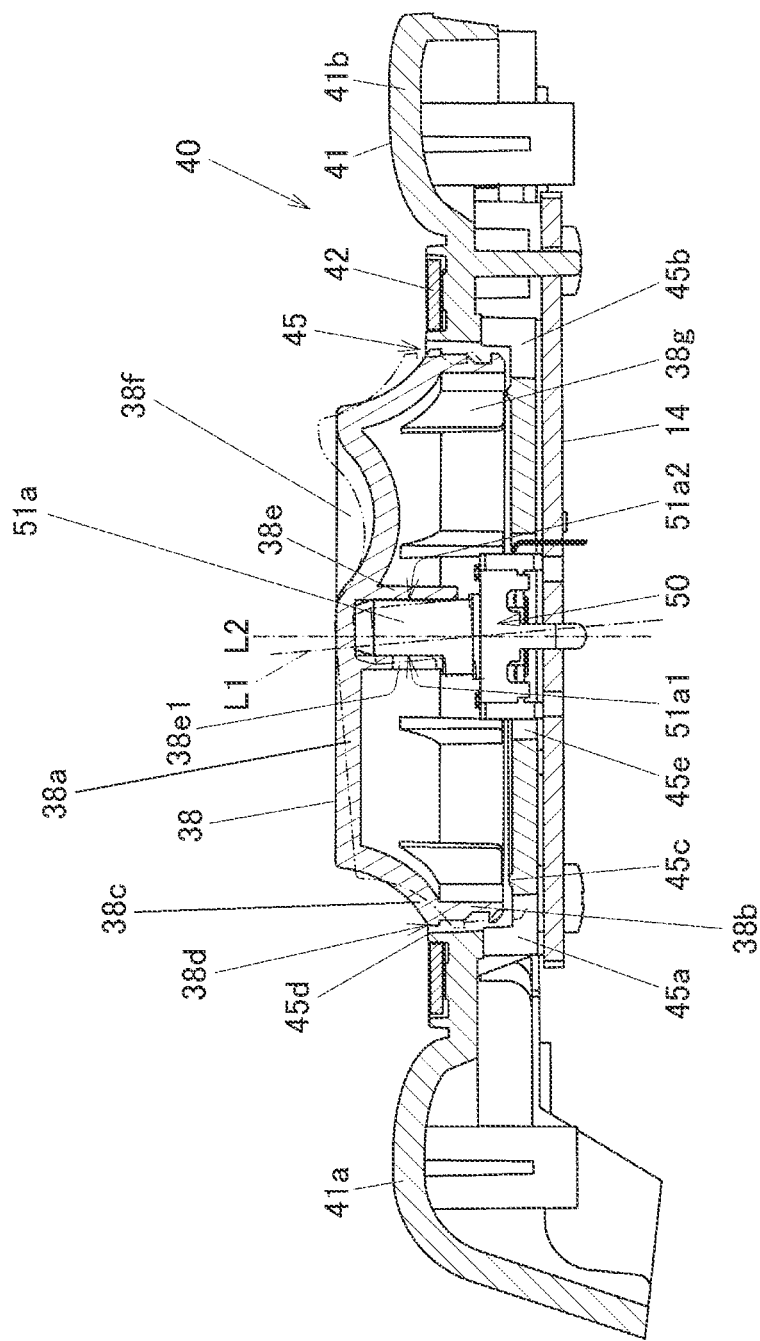
FIG. 3 is a sectional view of the electronic keyboard instrument according to the embodiment of the present disclosure, taken along a line III-III of FIG. 2.
Figure 4:
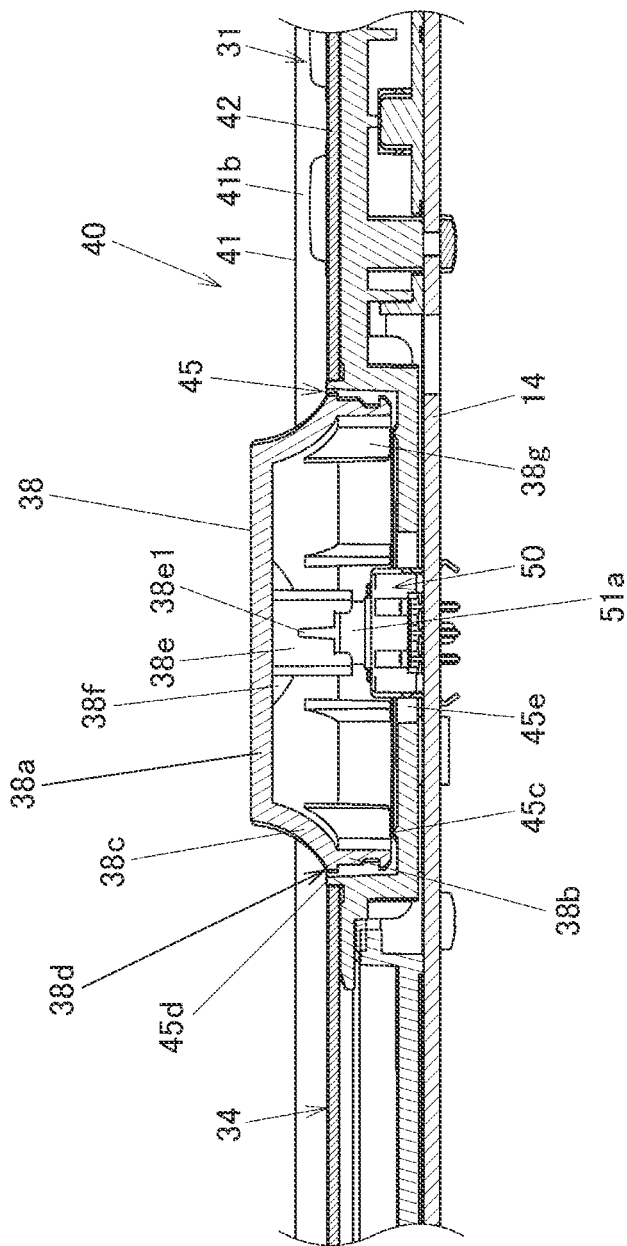
FIG. 4 is a sectional view of the electronic keyboard instrument according to the embodiment of the present disclosure, taken along a line IV-IV of FIG. 2.
Figure 5:
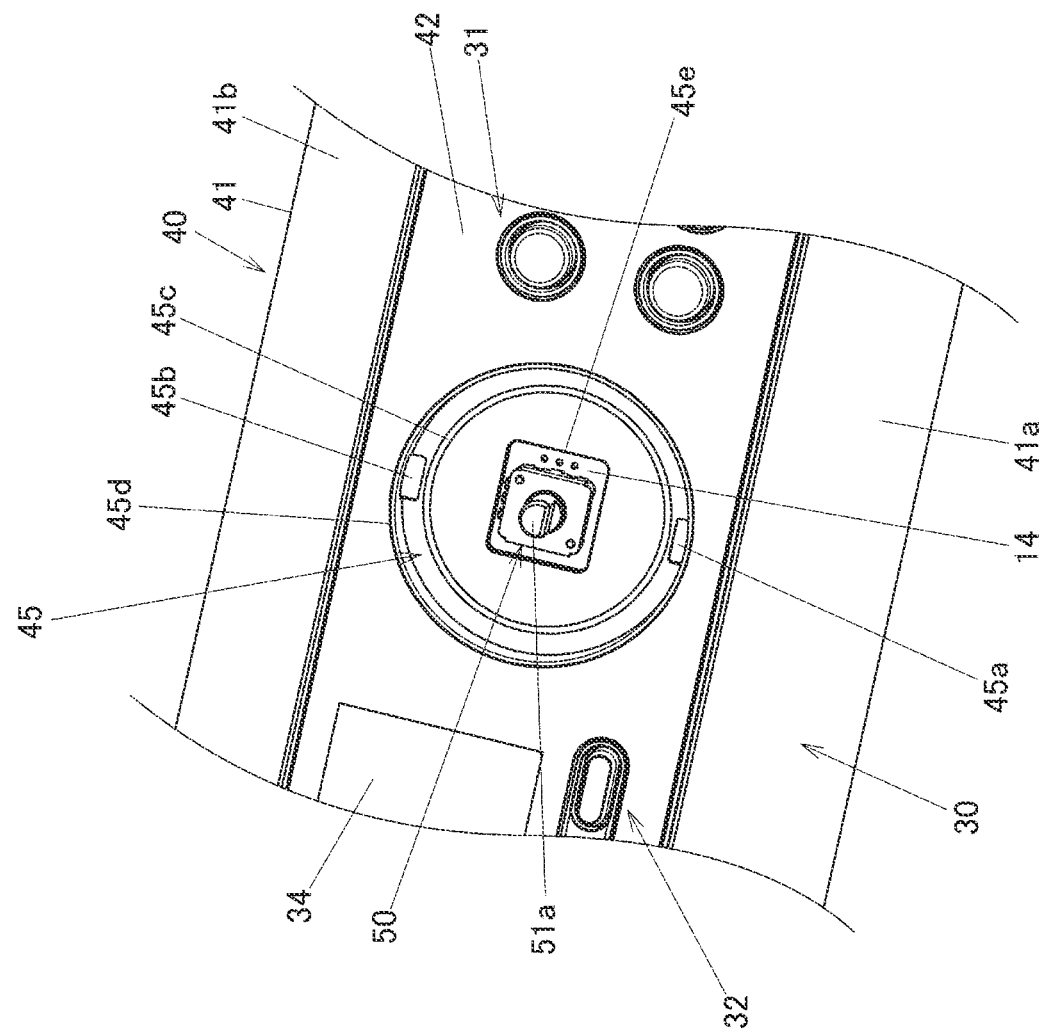
FIG. 5 is a perspective view of a rotary-knob placement portion of the electronic keyboard instrument according to the embodiment of the present disclosure, without the rotary knob.

As shown in FIGS. 2 to 4, the upper surface of the top plate portion 38a of the rotary knob 38 is provided with a fingering marker portion 38f leading an operator to touch the fingering marker portion 38f with a part of the body for a rotating operation, or to put a finger on the fingering marker portion 38 for operating the rotary knob 38. In the present embodiment, the fingering marker portion 38f is provided in a spherical concave shape. The fingering marker portion 38f is provided on a side of the D-shaped curved surface 51a2, opposite to the chipped portion 51a1 of the attaching portion 51a of the rotating shaft 51.

Between an inner surface of the large-diameter wall portion 38b and an inner surface of the concave connecting portion 38c in the rotary knob 38, ribs 38g are provided at predetermined intervals in a circumferential direction. A lower surfaces of the ribs 38g are in proximity of or slide on the annular protrusion 45c on the bottom surface of the rotary-knob placement portion 45.

Figure 6A:
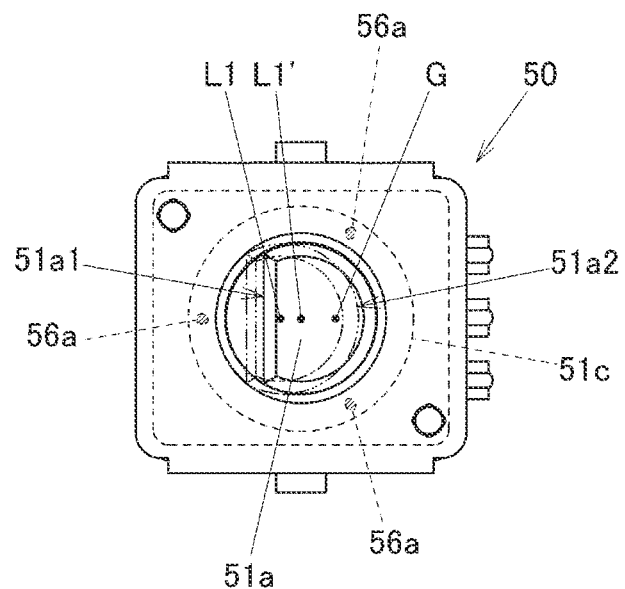
FIG. 6A is a plane view of a rotary encoder of the electronic keyboard instrument according to the embodiment of the present disclosure.
Figure 6B:
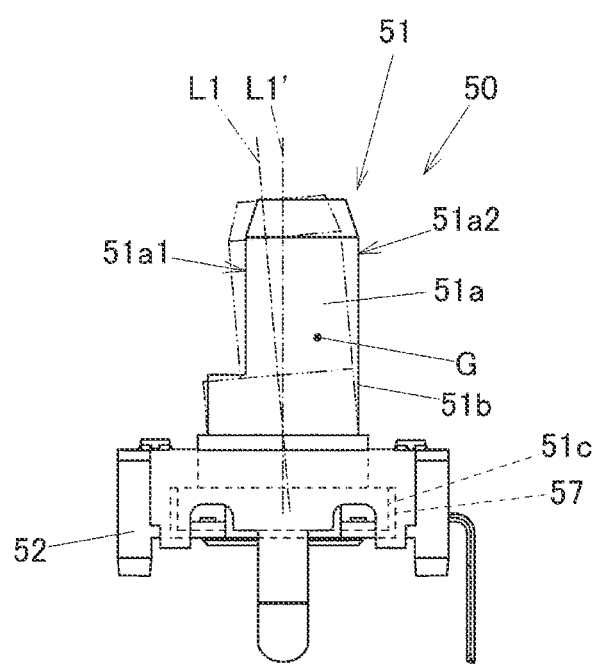
FIG. 6B is a side view of the rotary encoder of the electronic keyboard instrument according to the embodiment of the present disclosure.
Figure 7A:
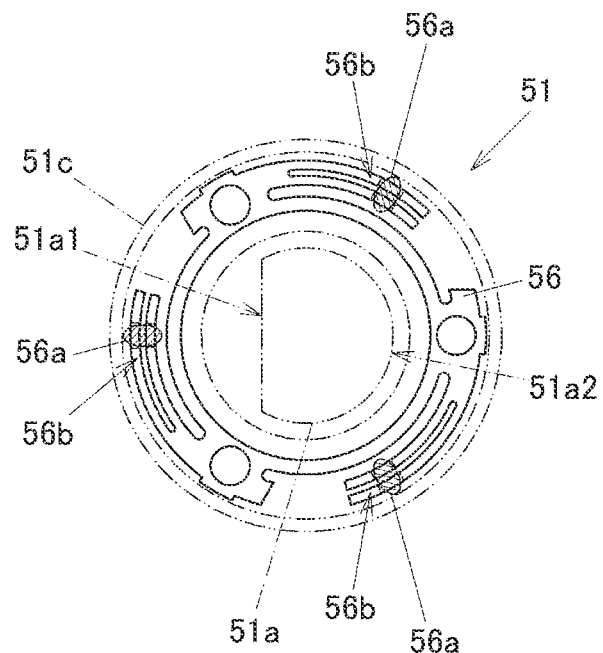
FIG. 7A is a bottom view of the rotating shaft showing members of the rotary encoder according to the embodiment of the present disclosure.

Next, the rotary encoder 50 to which the rotary knob 38 is attached is described with reference to FIGS. 6A, 6B, 7A, and 7B. As shown in FIGS. 6A and 6B, the rotating shaft 51 of the rotary encoder 50 includes: the attaching portion 51a having a D shape as seen from above with the chipped portion 51a1 and the curved surface 51a2; a flange portion 51c having a flange shape; and a circumferential poriont 51b provided between the attaching portion 51a and the flange portion 51c. As shown in FIG. 7A, a lower surface of the flange portion 51c is provided with a slider 56 that is a substantially annular sheet metal. In FIG. 7A, for easy understanding of the figure, a shape of the rotating shaft 51 other than the slider 56 is shown by dash-dot-dot lines. In the slider 56, tip ends of two cantilever leaf spring portions 56b having an arc shape have a contact 56a bent downward shown with hatching in FIG. 7A. By the cantilever leaf spring portions 56b, the contact 56a is pushed down to slid on a conductive portion 58 of a contact case 57 to be described later and is electrically connected to the conductive portion 58. The rotating shaft 51 is included in the rotary encoder 50 having the slider 56 with three contacts 56a and includes the attaching portion 51a having the D-shaped curved surface (curved surface 51a2).

Figure 7B:
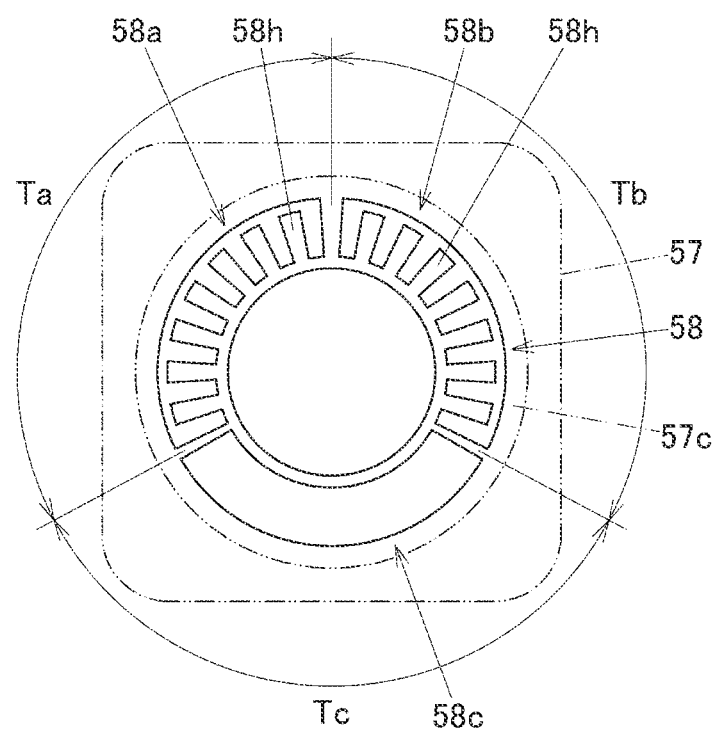
FIG. 7B is a plane view of a contact case showing members of the rotary encoder according to the embodiment of the present disclosure.

As shown in FIG. 6B, the contact case 57 is below the rotary encoder 50. The contact case 57 is accommodated in a sheet metal cover 52 connected to the substrate 14. As shown in FIG. 7B, the contact case 57 is provided with a circular concave portion 57c in which the flange portion 51c is accommodated. The contact case 57 has a conductive portion 58 that is an annular metal provided in the concave portion 57c. In FIG. 7A, for easy understanding of the figure, a shape of the contact case 57 other than the conductive portion 58 is shown by dash-dot-dot line. Of the conductive portion 58 in FIG. 7B, a range Ta having about 120° on the left side is a phase A 58a in which insulating portions 58h are intermittently provided, and a range Tb having about 120° on the right side is a phase B 58b in which insulating portions 58h are intermittently provided, and a range Tc having about 120° on the lower side is a phase C 58c. When each of the three contacts 56a of the slider 56 of the rotating shaft 51 touches any of the phase A 58a, the phase B 58b, and the phase C 58c, pulse waves are generated according to a rotating direction of the rotating shaft 51 (left rotation (counterclockwise direction) or right rotation (clockwise direction)).

As shown by the dash-dot-dot lines in FIGS. 6A and 6B, the rotating shaft 51 (attaching portion 51a) of the rotary encoder 50 slants slightly to the chipped portion 51a1. In FIGS. 6A and 6B, the inclination of the rotating shaft 51 is exaggerated for easy understanding. The rotating shaft 51 is inclined for the following reason.

Since the rotating shaft 51 is provided with the chipped portion 51a1, the center of gravity G of the rotating shaft 51 is closer to the curved surface 51a2 (a right side for FIGS. 6A and 6B) than a shaft center L1 of the rotating shaft 51. Therefore, as shown in FIG. 6A, two contacts 56a out of the three contacts 56a are on a side of the curved surface 51a2 of the attaching portion 51a of the rotating shaft 51 to keep balance. However, repulsive forces from the two contacts 56a is larger, thereby slanting the shaft center L1 of the rotating shaft 51 to the chipped portion 51a1 with respect to an original central axis L1'.

When the rotary knob 38 is attached to the attaching portion 51a of the rotary encoder 50 whose rotating shaft 51 is inclined in this way, the rotary knob 38 also slants to the chipped portion 51a1 of the rotating shaft 51 as shown by a dash-dot-dot line in FIG. 3. That is, the shaft center L1 of the rotation axis 51 is inclined with respect to a perpendicular line (that is, a shaft center L2 of the rotary-knob placement portion 45 having a circular shape as seen from above) of a flat part of the panel 40 (for example, a part in which the panel sheet 42 is provided). The inclination of the rotary knob 38 shown by the dash-dot-dot line in FIG. 3 is exaggerated for easy understanding and is such that it is difficult to notice the inclination of the rotary knob 38 stationary with naked eyes in reality. However, when the rotary knob 38 is rotated (particularly, continuously rotated), the large-diameter rotary knob 38 rotating may appear to be warped considerably. In this case, the rotating shaft 51 (rotary knob 38) is continuously rotate in one direction of at least a clockwise direction and a counterclockwise direction, and a height of the connecting portion 38d of the rotary knob 38 and a height of the annular rib 45d on the outer periphery of the rotary knob 38 slightly deviate at some places due to the slight inclination of the rotary knob 38. Accordingly, during the continuous rotation of the rotary knob 38, the deviation in height between the connecting portion 38d and the annular rib 45d may be noticeable. In addition, when the outer periphery of the concave connecting portion 38c of the rotary knob 38 is with mirror finish, the warp during the rotation of the rotary knob 38 becomes more noticeable. Further, if size (a diameter) of the rotary knob 38 is large, the deviation in height on an outer side in a radial direction becomes large and the warp during the rotation may be more noticeable.

Therefore, in the rotary knob 38 of the present embodiment, the fingering marker portion 38f of the top plate portion 38a of the rotary knob 38 is provided on a side of the curved surface 51a2 of the rotating shaft 51 of the rotary encoder 50 (that is, opposite to the inclination direction of (the shaft center L1 of) the rotating shaft 51). When a user touches the fingering marker portion 38f having concave shape with a finger (mostly, an index finger) and continuously rotates the rotary knob 38, the fingering marker portion 38f on the rotary knob 38 is pushed down by the finger, thereby the shaft center L1 of the rotating shaft 51 being substantially perpendicular to the panel 40 (that is, coinciding with the shaft center L2 of the rotary-knob placement portion 45) as shown by a solid line in FIG. 3. Since the rotary knob 38 is rotated in this way, the warp of the rotary knob 38 during the rotation becomes unnoticeable.

Even if the rotary knob 38 is pushed down too strongly by the finger, the ribs 38g of the rotary knob 38 touch the annular protrusion 45c to prevent the lower surface of the large-diameter wall portion 38b of the rotary knob 38 from directly touching the bottom surface of the rotary-knob placement portion 45.

Although an embodiment of the present disclosure has been described, the present disclosure is not limited to the embodiment and various changes can be made. For example, the fingering marker portion 38f has a concave shape in the embodiment but is not limited thereto. The fingering marker portion 38f may have another shape, such as a convex shape, or printing (marking). The fingering marker portion 38f can be defined as a part which the operator touches with a part of the body. The rotary-knob placement portion 45 has a concave shape in the embodiment but is not limited thereto. The rotary-knob placement portion 45 may have a through-hole shape or a convex shape. A panel in which a hole portion for the rotating shaft 51 of the rotary encoder 50 is formed may be the rotary-knob placement portion 45. The electronic component is the rotary encoder 50 in the embodiment but is not limited thereto. The present disclosure can be applied to another electronic component having a rotating shaft.

According to the embodiment, the electronic keyboard instrument 10, which is an electronic musical instrument as an electronic device, includes: the rotating shaft 51 inclined with respect to a perpendicular line of the panel 40; and the rotary knob 38 that is attached to the rotating shaft 51 and has a fingering marker portion 38f provided opposite to an inclination direction of the rotating shaft 51. Even if the rotary knob 38 is attached to the rotating shaft 51 inclined, it is possible to prevent the rotary knob 38 rotating from appearing to be warped, thereby achieving the electronic keyboard instrument 10 with good appearance.

The rotating shaft 38 is configured to continuously rotate in one direction of at least the clockwise direction and the counterclockwise direction. The electronic keyboard instrument 10 having the rotary knob 38 configured to continuously rotate can be with good appearance regardless of the rotation direction.

The fingering marker portion 38f has a concave shape and is touchable by the operator with apart of the body for the rotating operation. Since the user naturally touches the fingering marker portion 38f with a part of the body, such as a finger (and a tool, such as a pen), to operate the rotary knob 38, the user can perform rotating operation to cancel the warp during the rotation of the rotary knob 38 unconsciously.

The rotating shaft 51 is included in the rotary encoder having the slider 56 with the three contacts 56a, the rotating shaft 51 includes the attaching portion 51a having the curved surface 51*a*2 in a D shape, and two contacts out of the three contacts 56*a* are on a side of the curved surface 51*a*2 of the attaching portion 51*a*. It is possible to prevent the rotary knob 38 rotating, that is attached to the rotary encoder 50 whose attaching portion 51*a* has a D shape, from appearing to be warped.

Note that, for example, even if repulsive forces from the two contacts 56*a* is smaller than the embodiment of the present disclosure and the shaft center L1 of the rotating shaft 51 slants to a side of the curved surface 51*a*2 with respect to the original central axis L1', the fingering marker portion 38*f* of the rotary knob 38 may be provided opposite to the inclination direction of the rotating shaft 51.

The outer side of the rotary knob 38 of the panel 40 is provided with the annular rib 45*d*. Even if the outer side of the rotary knob 38 is provided with the annular rib 45*d*, the warp during the rotation of the rotary knob 38 can be made unnoticeable.

The rotary knob 38 includes: the top plate portion 38*a* that has a circular shape and is provided with the fingering marker portion 38*f*; the large-diameter wall portion 38*b* having a cylindrical wall surface whose diameter is larger than a diameter of the top plate portion 38*a*; and the concave connecting portion 38*c* connecting the top plate portion 38*a* and the large-diameter wall portion 38*b* in a concave curved shape in across-sectional view. The connecting portion 38*d* between the large-diameter wall portion 38*b* and the concave connecting portion 38*c* is substantially the same height as the annular rib 45*d*. Even if the rotary knob 38 has the concave connecting portion 38*c* provided on the outer side, it is possible to make the warp during the rotation unnoticeable.

The outer peripheral surface of the concave connecting portion 38*c* is with mirror finish. Even if the rotary knob 38 has a mirror-finished outer periphery and the warp during the rotation is more noticeable, it is possible to make the warp during the rotation unnoticeable.

The electronic keyboard instrument 10, which is an electronic musical instrument, includes: the rotating shaft 51 inclined with respect to a perpendicular line of the panel 40; the rotary knob 38 that is attached to the rotating shaft 51 and has the fingering marker portion 38*f* provided opposite to the inclination direction of the rotating shaft 51; and a speaker configured to produce a musical sound based on rotating operation of the rotary knob 38. It possible to provide the electronic keyboard instrument 10 with the warp during the rotation of the rotary knob 38 unnoticeable.

According to the present disclosure, it is possible to provide an electronic device and an electronic keyboard instrument having good appearance even when a rotary knob is attached to a rotating shaft inclined.

Although some embodiments of the present disclosure have been described, the embodiments are examples and are not intended to limit the scope of the invention. The novel embodiments can be implemented in various other embodiments, and various omissions, replacements, and changes can be made without departing from the gist of the invention. The embodiments and variations thereof are included in the scope and the gist of the invention and are included in the invention described in the claims and equivalents thereof.

The invention claimed is:

1. An electronic musical instrument comprising:
a rotating shaft, a rotation axis of the rotating shaft being inclined with respect to a line perpendicular to a panel through which the rotating shaft extends; and
a rotary knob that is attached to the rotating shaft, the rotary knob including (i) a top plate portion and (ii) a fingering marker portion provided at one specific point of the top plate portion opposite to an inclination direction of the rotating shaft.

2. The electronic musical instrument according to claim 1, wherein the rotating shaft is configured to rotate continuously in at least one of a clockwise direction and a counterclockwise direction.

3. The electronic musical instrument according to claim 1, wherein the fingering marker portion has a concave shape and is touchable by an operator with a part of a body to perform a rotating operation of the rotary knob.

4. The electronic musical instrument according to claim 1, wherein:
the rotating shaft is included in a rotary encoder having a slider with three contacts,
the rotating shaft comprises an attaching portion having a D-shaped curved surface, and
two out of the three contacts are on a side of the curved surface of the attaching portion.

5. The electronic musical instrument according to claim 1, wherein an outer side of the rotary knob of the panel is provided with an annular rib.

6. The electronic musical instrument according to claim 5, wherein:
the top plate portion has a circular shape, and
the rotary knob further comprises:
a large-diameter wall portion having a cylindrical wall surface whose diameter is larger than the top plate portion; and
a concave connecting portion connecting the top plate portion and the large-diameter wall portion in a concave curved shape in a cross-sectional view, and
a connecting portion between the large-diameter wall portion and the concave connecting portion is substantially a same height as the annular rib.

7. The electronic musical instrument according to claim 6, wherein an outer peripheral surface of the concave connecting portion has a mirror finish.

8. The electronic musical instrument according to claim 1, wherein the rotating shaft is provided in an inside of the panel and is included in a rotary encoder having a shaft center inclined with respect to the line perpendicular to the panel so as to be continuously rotatable.

9. The electronic musical instrument according to claim 8, wherein the fingering marker portion is configured to receive a touch from a part of a body of an operator.

10. The electronic musical instrument according to claim 9, wherein:
the rotating shaft has a chipped portion, and
the inclination direction of the shaft center is a direction slanted toward the chipped portion with respect to a central axis.

11. The electronic musical instrument according to claim 1, further comprising a speaker configured to produce a musical sound based on a rotating operation of the rotary knob.

12. An electronic musical instrument comprising:
a rotating shaft inclined with respect to a perpendicular line of a panel; and
a rotary knob that is attached to the rotating shaft and that has a fingering marker portion provided opposite to an inclination direction of the rotating shaft,
wherein an outer side of the rotary knob of the panel is provided with an annular rib.

13. The electronic musical instrument according to claim 12, further comprising a speaker configured to produce a musical sound based on a rotating operation of the rotary knob.

14. The electronic musical instrument according to claim 12, wherein:
the rotary knob comprises:
a top plate portion that has a circular shape and is provided with the fingering marker portion;
a large-diameter wall portion having a cylindrical wall surface whose diameter is larger than the top plate portion; and
a concave connecting portion connecting the top plate portion and the large-diameter wall portion in a concave curved shape in a cross-sectional view, and
a connecting portion between the large-diameter wall portion and the concave connecting portion is substantially a same height as the annular rib.

15. The electronic musical instrument according to claim 14, wherein an outer peripheral surface of the concave connecting portion has a mirror finish.

16. An electronic musical instrument comprising:
a rotating shaft inclined with respect to a perpendicular line of a panel; and
a rotary knob that is attached to the rotating shaft and that has a fingering marker portion provided opposite to an inclination direction of the rotating shaft,
wherein:
the rotating shaft is provided in an inside of the panel and is included in a rotary encoder having a shaft center inclined with respect to the perpendicular line of the panel so as to be continuously rotatable,
the rotary knob has a top plate portion, and
the fingering marker portion leads an operator to touch the fingering marker portion with a part of a body and is provided at a position in the top plate portion opposite to an inclination direction of the shaft center.

17. The electronic musical instrument according to claim 16, further comprising a speaker configured to produce a musical sound based on a rotating operation of the rotary knob.

18. The electronic musical instrument according to claim 16, wherein:
the rotating shaft has a chipped portion, and
the inclination direction of the shaft center is a direction slanted toward the chipped portion with respect to a central axis.

* * * * *